US006636583B2

(12) United States Patent
Ratzmann et al.

(10) Patent No.: US 6,636,583 B2
(45) Date of Patent: Oct. 21, 2003

(54) GREASE BEARING WITH GALLIUM SHUNT

(75) Inventors: Paul Michael Ratzmann, Germantown, WI (US); Suryaprakash Ganti, Guilderland, NY (US); Mark Ernest Vermilyea, Niskayuna, NY (US); James Edward Simpson, Schenectady, NY (US)

(73) Assignee: GE Medical Systems Global Technology Co., LLC, Waukesha, WI (US)

(*) Notice: Subject to any disclaimer, the term of this patent is extended or adjusted under 35 U.S.C. 154(b) by 0 days.

(21) Appl. No.: 09/683,926

(22) Filed: Mar. 4, 2002

(65) Prior Publication Data

US 2003/0165217 A1 Sep. 4, 2003

(51) Int. Cl.⁷ .................................................. H01J 35/10
(52) U.S. Cl. ......................... 378/133; 378/141; 378/142
(58) Field of Search ................................ 378/121, 125, 378/127, 128, 130, 133, 132, 141, 142

(56) References Cited

U.S. PATENT DOCUMENTS 5,583,907 A  * 12/1996  Ono et al. ................... 378/132
6,307,916 B1 * 10/2001  Rogers et al. .............. 378/141

* cited by examiner

Primary Examiner—Drew A. Dunn
Assistant Examiner—Courtney Thomas
(74) Attorney, Agent, or Firm—Peter J. Vogel

(57) ABSTRACT

An x-ray tube 10 is provided including an anode mounted to a rotatable shaft positioned within a center bore of a stem element, a bearing assembly positioned between the rotatable shaft and the stem element, and at least one liquid metal shunt in thermal communication with both the rotatable shaft and the stem element, located adjacent to the anode between the anode and the bearing assembly, and directing heat generated at the anode away from the bearing assembly by allowing heat to flow from the rotatable shaft into the stem element prior to heat reaching the bearing assembly.

17 Claims, 1 Drawing Sheet

GREASE BEARING WITH GALLIUM SHUNT

BACKGROUND OF INVENTION

The present invention relates generally to a radiography device and, more particularly, to a radiography device having a grease bearing with a gallium shunt.

The X-ray tube has become essential in medical diagnostic imaging, medical therapy, and various medical testing and material analysis industries. Typical X-ray tubes are built with a rotating anode structure for the purpose of distributing the heat generated at the focal spot. The anode is rotated by an induction motor consisting of a cylindrical rotor built into a cantilevered axle that supports the disc-shaped anode target, and an iron stator structure with copper windings that surrounds the elongated neck of the X-ray tube that contains the rotor. The rotor of the rotating anode assembly being driven by the stator which surrounds the rotor of the anode assembly is at anodic potential while the stator is referenced electrically to the ground. The X-ray tube cathode provides a focused electron beam that is accelerated across the anode-to-cathode vacuum gap and produces X-rays upon impact with the anode.

The dissipation of heat generated in the production of X-rays has been a driving force in the development of X-ray tube design. Excessive heat can have a negative impact on the X-ray tube's performance. In addition, heat disbursed within the X-ray tube can have a deleterious effect on the bearings and lubricants used to facilitate the rotation of the anode. Bearings can become excessively worn and damaged over time and thereby degrade performance. Lubricants may break down when exposed to excessive heat and are also known to produce an effect referred to as outgassing. When lubricants experience outgassing, they break down from their fluid form and produce vapors that may penetrate the seals of the bearing compartment and penetrate into the vacuum portion of the X-ray tube. Once the vacuum portion of the x-ray tube has been compromised in such a fashion, the performance of the x-ray tube may be seriously impacted.

One approach towards increasing dissipation of unwanted heat has been directed through increasing the rotational velocity of the anode. While increasing the anode's rotational velocity can improve heat dissipation, it can also carry with it the effect of straining traditional bearing designs. As the rotational speed increases, torque can be transmitted through the bearings and may result in race rotation, chatter, and excessive noise generation. Thus, considerable design effort has been exerted towards bearing and lubricant designs that are capable of handling the increased velocity. Often these designs result in complex bearing designs or novel lubricants that can negatively impact the time and cost involved in X-ray tube design and manufacturing.

A second approach to increasing the heat dissipation of the X-ray tube has been to combine rotation of the anode with secondary heat transfer modes. One such secondary heat transfer arrangement utilizes liquid metal, such as gallium, to provide thermal communication between the rotating shaft and external heat sink elements. Alternately, liquid metal itself may be used in the form of a plane bearing such that heat is transferred away from the shaft through the bearing itself. Often, however, while these designs succeed in controlling the anode's temperature, they often fail to protect the bearings themselves from such thermal energy. Thus, the bearings may be subjected to undesirable temperatures and suffer the aforementioned detrimental effects. In addition, when liquid metal is used as the bearing or lubricant itself, the liquid metal may be subjected to undue stresses and may experience similar failures to traditional bearings such as outgassing.

It would therefore be highly desirable to have an X-ray tube rotation bearing that benefited from the simplicity and effectiveness of traditional bearing designs while being afforded the thermal protection provided by liquid metal heat transfer arrangements. In addition, it would be desirable to have an X-ray tube rotation bearing design that protected the vacuum portion of the X-ray tube from effects such as outgasing.

SUMMARY OF INVENTION

It is, therefore, an object of the present invention to provide an x-ray tube with a reduced thermal flow from the anode through the bearings. It is a further object of the present invention to provide an X-ray tube with a reduced likelihood of outgasing penetrating the vacuum portion of the tube.

In accordance with the objects of the present invention, an X-ray tube is provided. The X-ray tube includes an anode mounted to a rotatable shaft. The shaft is positioned within a central bore of a stem. A bearing assembly is positioned between the stem and the rotatable shaft. At least one grease injection port provides grease lubricant to the bearing assembly. A liquid metal shunt is positioned between the anode and the bearing assembly and is in thermal communication with the rotatable shaft and the stem. Heat generated at the anode location can thereby pass through the liquid metal heat transfer component and into the stem prior to impacting the bearing assembly.

Other objects and advantages of the present invention will become apparent upon the following detailed description and appended claims, and upon reference to the accompanying drawings.

DETAILED DESCRIPTION

Figure 1:
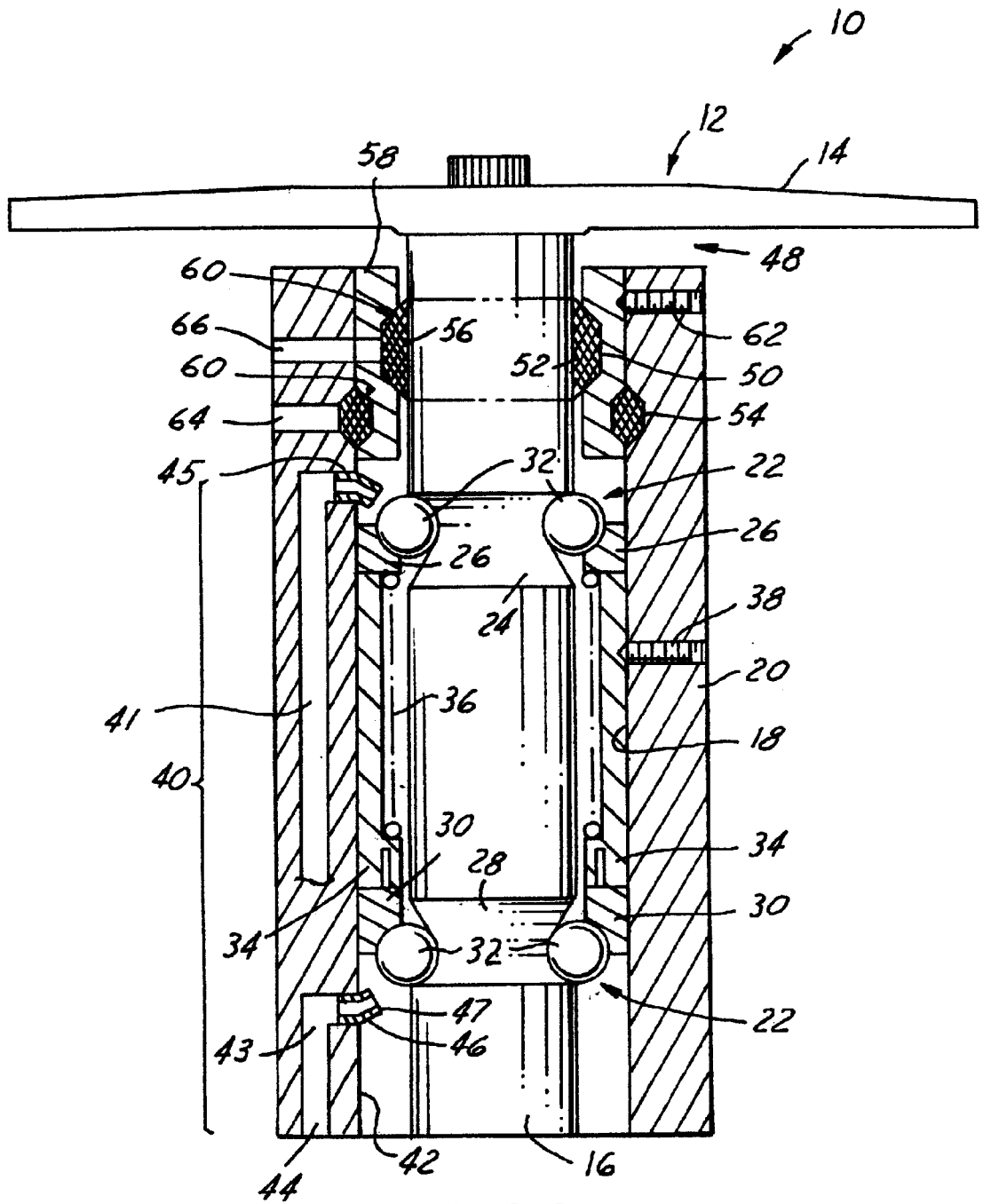
FIG. 1 is a cross-sectional illustration of an embodiment of an X-ray tube device in accordance with the present invention.

Referring now to FIG. 1, an x-ray tube device 10 is depicted having a rotating anode assembly 12. The rotating anode assembly 12 includes an anode 14 in communication with a rotatable shaft 16. The rotatable shaft 16 is positioned within a center bore 18 of a stem element 20. A bearing assembly 22 is positioned between the rotatable shaft 16 and the stem element 20 in order to facilitate the rotation of the rotatable shaft 16 within the center bore 18.

Although a variety of bearing assemblies 22 are contemplated by the present invention, one embodiment includes a forward inner race 24, a forward outer race 26, a rearward inner race 28 and a rearward outer race 30. A plurality of balls 32 are positioned between the corresponding inner and outer races to allow for rotational movement of the inner races 24, 28 in relation to the outer races 26, 30. A bearing spacer 34 and a preload spring 36 may be utilized to help retain a proper orientation of the bearing assembly 22. In addition, a bearing retaining screw 38 may be utilized to secure the bearing assembly 22 within the stem element 20 after assembly.

In order to ensure proper operation of the bearing assembly 22 it is important that low rotational resistance of the bearing assembly 22 be maintained. In order to accomplish this, the present invention further includes a grease supply system 40. The grease supply system 40 helps guarantee the bearing assembly 22 is constantly supplied with proper lubrication during operation. Although various grease supply systems 40 are contemplated, in one embodiment the grease supply system 40 includes at least one grease supply line 42 providing grease 44 to the plurality of balls 32 through at least one grease injector port 46. In the illustrated embodiment, the x-ray tube 10 is shown with a forward grease supply line 41, a rearward grease supply line 43, a forward grease injector port 45 and a rearward grease injector port 47. It should be understood that a wide variety of formulations for grease 44 are well known in the art. In this way the bearing assembly 22 is sufficiently lubricated and therefore noise generation, race rotation, and chatter issues are reduced. The use of grease 44 as a lubricant provides an inexpensive and effective way of lubricating the bearing assembly 22.

Although the use of grease 44 provides an inexpensive approach to lubrication of the bearing assembly 22, care must be taken to prevent the heat generated at the anode 14 from breaking down the grease 44. In addition, if the grease 44 does begin to breakdown, it is also important to prevent any out-gassing of the grease from penetrating the vacuum area 48 of the x-ray tube 10. The present invention limits both grease breakdown and out-gassing penetration through the use of a liquid metal shunt 50, such as gallium, (Ga) positioned between the bearing assembly 22 and the anode 14. The liquid metal shunt 50 provides a path for heat generated at the anode 14 to pass from the shaft 16, through the liquid metal shunt 50 and into the stem clement 20 prior to reaching the bearing assembly 22. While clearly some heat will continue to pass through the shaft 16 and reach the bearing assembly 22, the amount of heat bypassed into the stem element 20 and prevented from reaching the bearing assembly 22 allows for simple inexpensive lubricants such as grease 44 to be utilized. In addition, should out-gassing of the grease 44 occur, the liquid metal shunt 50 acts further as a seal barrier to prevent such out-gassing from reaching the vacuum area 48. In this way, the liquid metal shunt 50 acts as both a heat transfer element to limit the heat reaching the bearing assembly 22, but also as a seal barrier to protect the vacuum area 48.

Although the liquid may be formed in a variety of fashions, one embodiment contemplates the use of a rotational liquid metal shunt 52 and a stationary liquid metal shunt 54. The use of a dual liquid metal shunt 50 provides a variety of benefits. The amount of liquid metal 56 exposed to the rotating shaft 16 can be minimized while the surface area exposed remains maximized. This allows for a reduction in the opportunity for such liquid metal 56 to leak from the rotational shunt 52 and compromise the bearing assembly 22 or the vacuum area 48. In addition, the use of the stationary liquid metal shunt 54 allows for a stable heat transfer between the shaft 16 and the stem element 20. When the two shunts 52, 54 are used in combination, they provide a unique bypass route that diverts heat from the bearing assembly 22, while providing a reliable seal of the vacuum area 48 and minimizing liquid metal leakage into neighboring areas.

Although the liquid metal shunt 50 described can be formed in a variety of methods, in one embodiment, a shunt ring 58 is positioned between the shaft 16 and the stem element 20. Pockets 60 formed into the shunt ring 58, stem element 20 and possibly the shaft 16 may be used to form areas to house the liquid metal 56. A shunt ring retaining screw 62 may be utilized to secure the shunt ring 58 in position. A stationary fill tube 64 and a rotational fill tube 66 can be provided to maintain proper levels of liquid metal 56 within the stationary liquid metal shunt 54 and the rotational liquid metal shunt 52. Although specific elements have been described in connection with the stationary liquid metal shunt 54 and the rotational liquid metal shunt 52, it should be understood that a variety of methods of forming these shunts would be obvious to one skilled in the art.

While one particular embodiment of the invention have been shown and described, numerous variations and alternative embodiments will occur to those skilled in the art. Accordingly, it is intended that the invention be limited only in terms of the appended claims.

What is claimed is:

1. An x-ray tube device comprising:
    a rotatable shaft;
    an anode affixed to said rotatable shaft;
    a stem element having a center bore, at least a portion of said rotatable shaft positioned within said center bore;
    a bearing assembly positioned between said rotatable shaft and said stem element;
    a grease supply system in communication with said bearing assembly and supplying lubricant to said bearing assembly; and
    at least one liquid metal shunt in thermal communication with both said rotatable shaft and said stem element, said liquid metal shunt located adjacent to said anode and situated between said anode and said bearing assembly;
    wherein said liquid metal shunt directs heat generated at the anode away from said bearing assembly by allowing the heat to flow from said rotatable shaft into said stem element prior to the heat reaching said bearing assembly.

2. An x-ray tube device as described in claim 1 wherein said bearing assembly comprises:
    a forward inner race;
    a forward outer race;
    a rearward inner race;
    a rearward outer race; and
    a plurality of balls positioned between said forward inner race, said forward outer race, said rearward inner race, and said rearward outer race respectively.

3. An x-ray tube as described in claim 1 wherein said grease supply system comprises:
    at least one grease supply line;
    at least one grease supply port in communication with said at least one grease supply line and providing lubricant to said bearing assembly.

4. An x-ray tube as described in claim 1 wherein said at least one liquid metal shunt comprises gallium.

5. An x-ray tube as described in claim 1 wherein said at least one liquid metal shunt comprises:
    a rotational liquid metal shunt; and
    a stationary liquid metal shunt.

6. An x-ray tube as described in claim 1 wherein said grease supply system comprises:
    at least one grease supply line; and
    at least one grease injection port.

7. An x-ray tube as described in claim 1 wherein said grease supply system comprises:
    a forward grease supply line;

a rearward grease supply line;

a forward grease injection port; and a rearward grease injection port.

8. An x-ray tube as described in claim 1 further comprising:

a shunt ring having at least one pocket to house said at least one liquid metal shunt.

9. An x-ray tube as described in claim 1, wherein said at least one liquid metal shunt create a seal between said rotatable shaft and said stem element to prevent outgassing from escaping said bearing assembly.

10. An x-ray tube device comprising:

a rotatable shaft;

an anode affixed to said rotatable shaft;

a stem element having a center bore, at least a portion of said rotatable shaft positioned within said center bore;

a bearing assembly positioned between said rotatable shaft and said stem element;

a grease supply system in communication with said bearing assembly and supplying lubricant to said bearing assembly;

a rotational liquid metal shunt; and a stationary liquid metal shunt;

wherein said rotational liquid metal shunt and said stationary liquid metal shunt provide thermal communication between said rotatable shaft and said stem element, are located adjacent to said anode and situated between said anode and said bearing assembly, and direct heat generated at the anode away from said bearing assembly by allowing heat to flow from said rotatable shaft into said stem element prior to said heat reaching said bearing assembly.

11. An x-ray tube device as described in claim 10 wherein said bearing assembly comprises:

a forward inner race;

a forward outer race;

a rearward inner race;

a rearward outer race; and a plurality of balls positioned between said forward inner race, said forward outer race, said rearward inner race, and said rearward outer race respectively.

12. An x-ray tube as described in claim 10 wherein said grease supply system comprises:

at least one grease supply line;

at least one grease supply port in communication with said at least one grease supply line and providing lubricant to said bearing assembly.

13. An x-ray tube as described in claim 10 wherein said rotational liquid metal shunt and said stationary liquid metal shunt include gallium.

14. An x-ray tube as described in claim 10 wherein said grease supply system comprises:

at least one grease supply line; and at least one grease injection port.

15. An x-ray tube as described in claim 10 wherein said grease supply system comprises:

a forward grease supply line;

a rearward grease supply line;

a forward grease injection port; and a rearward grease injection port.

16. An x-ray tube as described in claim 10 further comprising:

a shunt ring positioned between said rotatable shaft and said stem element and formed to create pockets to house said rotational liquid metal shunt and said stationary liquid metal shunt.

17. An x-ray tube as described in claim 10, wherein said rotational liquid metal shunt and said stationary liquid metal shunt create a seal between said rotatable shaft and said stem element to prevent outgassing from escaping said bearing assembly.

* * * * *